June 15, 1943.　　　　J. R. TEDD　　　　2,321,953
LAWN MOWER SHARPENER
Filed Dec. 27, 1940　　　2 Sheets-Sheet 1
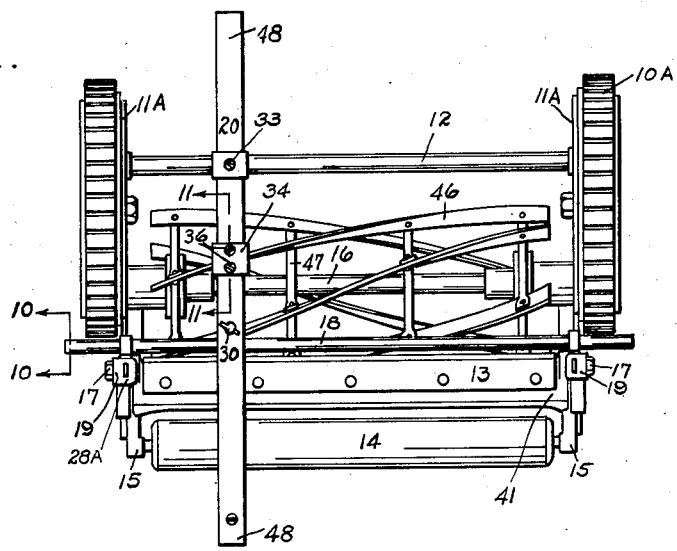
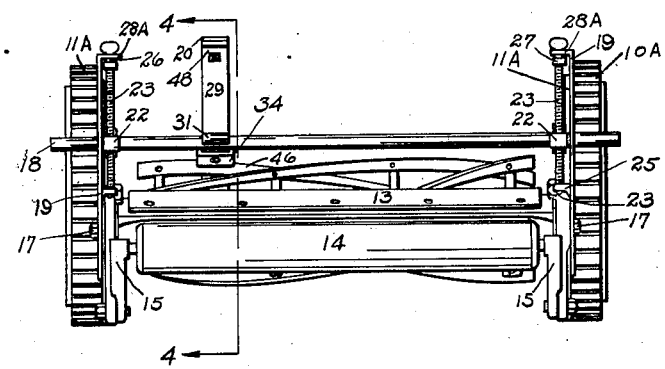
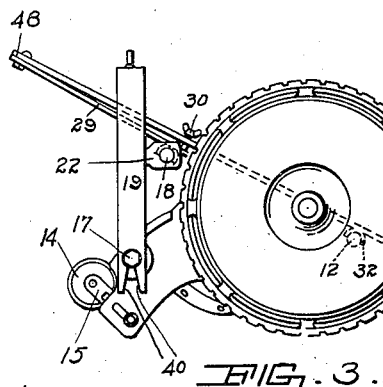
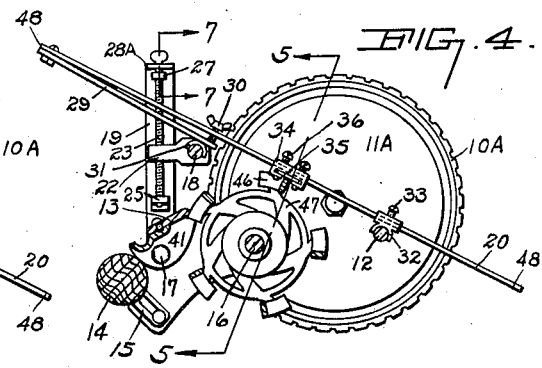
INVENTOR
JAMES R. TEDD.
BY
ATTORNEY June 15, 1943. J. R. TEDD 2,321,953
LAWN MOWER SHARPENER
Filed Dec. 27, 1940 2 Sheets-Sheet 2
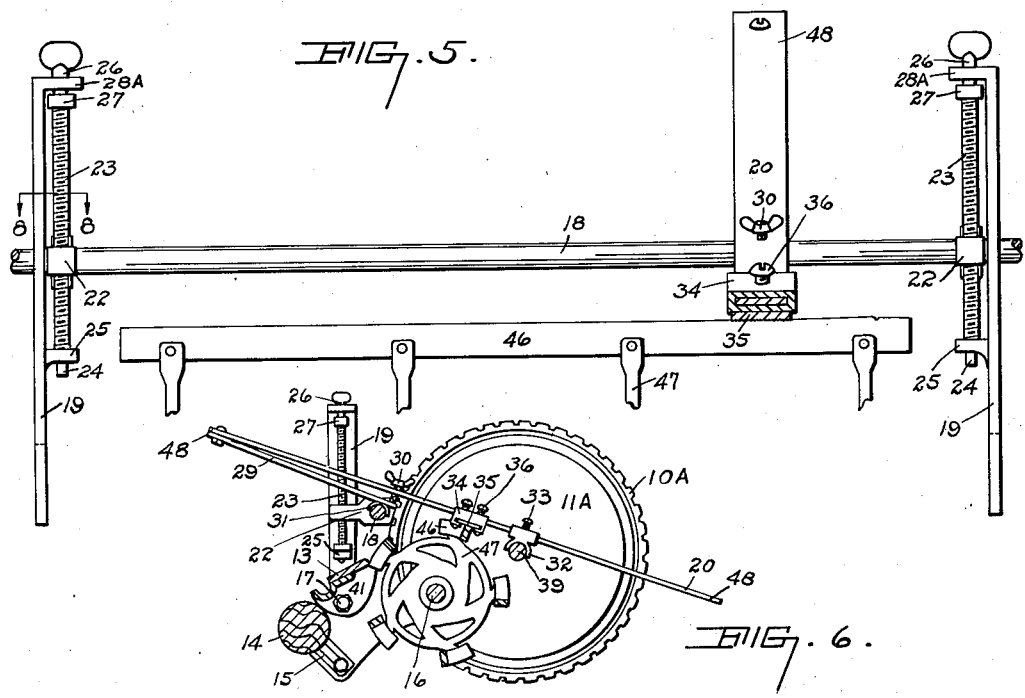
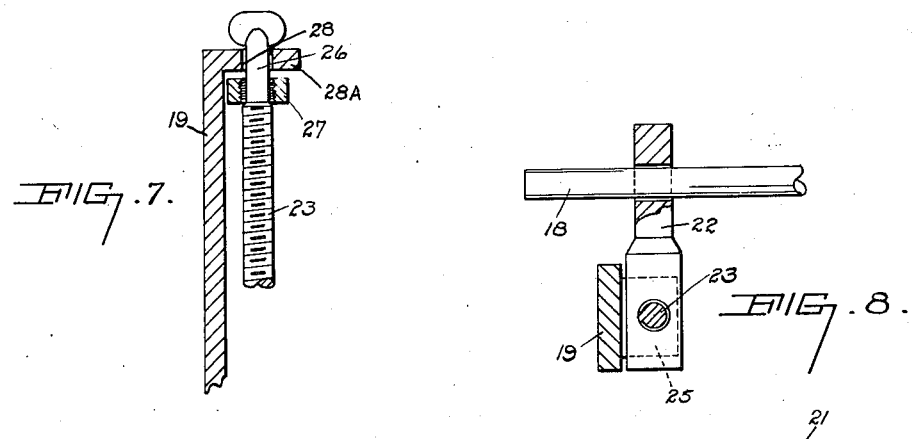
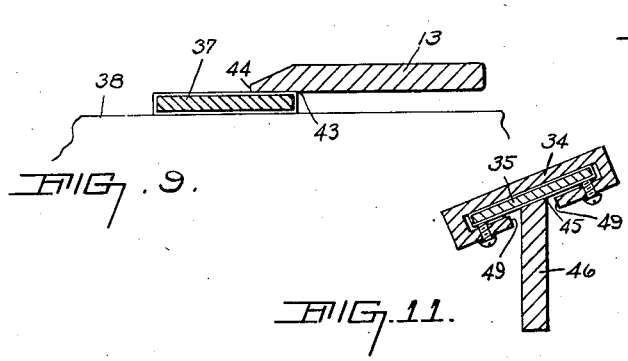
INVENTOR
JAMES R. TEDD.
BY
ATTORNEY Patented June 15, 1943

2,321,953

UNITED STATES PATENT OFFICE 2,321,953

LAWN MOWER SHARPENER

James R. Tedd, Willamette, Oreg.

Application December 27, 1940, Serial No. 371,973

1 Claim. (Cl. 76—82.1)

This invention relates generally to tool sharpening devices and particularly to a lawn mower sharpener.

The main object of this invention is to construct a lawn mower sharpener which will be simple in design, have few and rigid parts and which may be adapted to sharpen any of the common forms of revolving blade mowers.

The second object is to construct a sharpener of the class described in a manner that it may be easily applied to a mower and that the sharpening operation may be satisfactorily performed by an unskilled person.

The third object is to construct a sharpener of the class described in a manner that regardless of how distorted or uneven the blades of a mower may be, they may be easily placed in a proper cutting condition with the utmost precision after which the lawn mower may be resharpened at any time with very little effort.

The fourth object is to so construct a lawn mower sharpener that the proper angles of clearance along the stationary and moving cutting edges may be established and maintained at all times.

The fifth object is to so construct a sharpener that the cutting operation is entirely in the nature of a shear instead of tearing or wearing the blades of grass by rubbing them between engaging surfaces as is commonly the case.

I accomplish these and other objects in the manner set forth in the following specification as illustrated in the accompanying drawings, in which:

Fig. 1 is a plan of a lawn mower showing the sharpener mounted thereon.

Fig. 2 is an elevation of Fig. 1.

Fig. 3 is an end elevation of Fig. 1.

Fig. 4 is a transverse section taken along the line 4—4 in Fig. 2.

Fig. 5 is an elevation of the sharpener itself taken along the line 5—5 in Fig. 4 showing one of the cutter blades developed along a straight line.

Fig. 6 is a transverse section similar to Fig. 4 but showing a modified form of mower construction in which the brace rod is along the axis of the mower wheels.

Fig. 7 is a fragmentary section taken along the line 7—7 in Fig. 4.

Fig. 8 is a section taken along the line 8—8 in Fig. 5.

Fig. 9 is a transverse section through the stationary cutter bar showing the manner of truing same.

Fig. 10 is a transverse section taken along the line 10—10 in Fig. 1.

Fig. 11 is a fragmentary section taken along the line 11—11 in Fig. 1.

Similar numerals refer to similar parts throughout the several views.

Referring in detail to the drawings, there is shown a mower, including the drive wheels 10A which are mounted on the side frames 11A, which frames are held in spaced relation at one end by means of a brace rod 12 and at the other end by means of the stationary cutter bar 13. The usual roller 14 is rotatably mounted between the ends 15 of the said frames 11. Journaling in the side frames 11 is the shaft 16 which is driven from the wheels 10A in the manner common to most lawn mowers, namely: an internal gear and pinion drive. The position of the cutter bar clamping bolts 17 is also indicated.

Referring more particularly to my invention, the same will be seen to consist of three distinct parts, namely: a guide rod 18 which must be held parallel with the brace rod 12 supporting standards 19 for the guide rod 18 and the transverse slideable file holding bar 20 by means of which the sharpening operation is performed.

Referring in detail to the guide rod 18 shown in Fig. 10, the same will be seen to consist of a round rod 18 having a flattened face 21 formed thereon to enable same to be used as a straight edge for checking the alignment of the stationary cutter bar 13.

The guide rod 18 is slidably mounted at each end in the bracket 22 through which is threaded the vertical screw 23, whose lower end 24 is reduced in diameter and journals in the lug 25 which projects from the standard 19. The upper end 26 of the screw 23 has the threads removed therefrom to freely receive the nut 27 which rests upon the uppermost thread and prevents the screw 23 from rising out of its support in the lug 25. The end 26 journals in the enlarged hole 28 in the laterally turned upper end 26 of the standard 19.

The file holding bar 20 is a straight bar of flat stock and has secured on one end thereof a backwardly turned bar 29 whose angularity in relation to the file holding bar 20 is determined by the set screw 30. On the under side of the bar 29 is attached a saddle 31 adapted to ride accurately upon the guide rod 18. The position of the saddle 31 with relation to the member 29 may be fixed.

Slidably mounted on the opposite end of the bar 20 is a second saddle 32 which is adapted to ride accurately upon the brace rod 12, the saddle 32 may be held in a desired position by means of the set screw 33.

Between the saddles 31 and 32 and adjustably mounted on the bar 20 is the file holder 34 which is adapted to receive a short section of file 35 and to be clamped to the bar 20 by means of the set screws 36.

In order to true up the stationary cutter bar 13, it is necessary to have a straight flat file 37 which can be laid on a flat support 38, as shown in Fig. 9.

In the form of the device shown in Fig. 6, the brace rod 39 is disposed along the axis of the wheels 10A which practice is sometimes followed and the illustration is made merely to indicate the adaptability of my sharpener to different types of lawn mowers.

In order to make the standards 19 adaptable to any mower of this type, I have formed a flaring slot 40 at the lower end thereof in order to freely receive the clamping bolts 17 and to pivotally support each of the standards 19 until their correct position is established.

It is understood that the stationary cutter bar 13 is removably mounted on the cutter bar frame 41 which is tiltable on the bolts 17.

The operation of the sharpener is as follows: The cutter bar 13 is first removed from its frame 41 and drawn across the flat file 37 in a manner shown in Fig. 9 in order to true the face 43, the angularity of the edge 44 may be similarly corrected and checked by comparing it with the straight face 21 of the guide rod 18. Bar 13 is then put into its correct position in the mower and the standards 19 are put into the position shown in Fig. 3. The guide rod 18 is then put in position and the bar 20 is placed transversely across the rods 12 and 18 by engaging the saddles 31 and 32, the latter being moved longitudinally along the bar 20 until the desired position is found and then clamped by means of the screw 33. The file holder 34 is now moved longitudinally along the bar 20 until the file 35 engages the cutting face 45 of the spirally shaped cutting blade 46 which is mounted on the spokes 47 which radiate around the shaft 16. Starting from the assumption that the rods 12 and 18, as well as the face 43, are straight, it becomes necessary to bring the axes of the rods 12 and 18 in parallelism with each other, as well as in the same plane. The former is accomplished by adjusting the angularity of the standards 19 to meet the spacing action of the saddles 31 and 32, while the rods 12 and 18 are brought into the same plane by turning the screws 23 in the required direction, then by checking a given blade 46 with relation to the stationary bar 13, the precision adjustment is completed by turning the screw 30.

The ends 48 of the bar 20 are now grasped by the two hands of the operator and the bar 20 is moved longitudinally along the length of the mower, care being taken to hold the bar 20 as nearly as possible normal to the axis of the wheels 10A. As the file 35 is moved longitudinally, it follows that the blade 46, which is spirally formed, must rotate to conform to the position of the file in relation to which it is held by means of the edges 49 of the file holder 34.

As the high spots on the cutting face 45 of a blade 46 are filed down, further adjustment is made by means of the screw 30 until the correct relationship between a given blade 46 and the stationary bar 13 is obtained. The same process is repeated for each of the blades 46. It is desirable to number or otherwise identify the various blades 46 to facilitate the sharpening process. It can be seen from the foregoing that the same practice may be followed in any mower having a lateral brace rod 12 or a central brace rod 39, it merely requiring a different positioning of the saddle 32.

I am aware that many forms of lawn mower sharpeners have been constructed in the past. It is, therefore, not my intentions to cover such devices broadly but I do intend to cover all such forms and modifications thereof as fall fairly within the appended claim.

I claim:

In a precision grinder for lawn mowers of the types having a brace bar, a stationary cutter bar, and a plurality of curved blades rotating to engage the cutter bar; a rigid guide bar, means for securing said guide bar in exact parallelism with the axis of rotation of the curved lawn mower blades and the axis of the brace bar in a position so that the point of sharpening is substantially in the plane passing through the axis of the guide bar and the axis of the brace bar, and a file-holding assembly slidable on the brace bar of the mower and on said rigid guide bar, said assembly including guide means engaging the two parallel bars for holding the assembly normal to its line of sliding movement as the file engages the cutting edges of the curved blades, whereby the bearing faces of the guide means may also lie close to said plane, thus avoiding long stems for the guide means.

JAMES R. TEDD.